United States Patent [19]

Barry

[11] Patent Number: 4,948,160

[45] Date of Patent: Aug. 14, 1990

[54] METHOD AND APPARATUS FOR MODIFYING WHEEL ALIGNMENT IN STRUT TYPE SUSPENSION

[76] Inventor: David L. Barry, 14681 W. Barton Lake Dr., Vicksburg, Mich. 49097

[21] Appl. No.: 297,418

[22] Filed: Jan. 17, 1989

[51] Int. Cl.$^5$ .............................................. B62D 17/00
[52] U.S. Cl. .................................. 280/661; 280/6668; 29/401.1
[58] Field of Search ...................... 280/661, 668, 663; 29/401.1, 402.01

[56] References Cited

U.S. PATENT DOCUMENTS

| | | | |
|---|---|---|---|
| 3,819,202 | 6/1974 | Castoe | 280/661 |
| 3,917,308 | 11/1975 | Schulz | 280/661 |
| 4,194,760 | 3/1980 | Shiomi | 280/661 |
| 4,372,575 | 2/1983 | Hyma | 280/661 |
| 4,418,938 | 12/1983 | Sullivan | 280/661 |
| 4,618,162 | 10/1986 | Specktor | 280/661 |
| 4,733,884 | 4/1989 | Pettibone et al. | 280/661 |
| 4,736,964 | 4/1988 | Specktor | 280/661 |
| 4,753,454 | 6/1988 | Woehler | 280/661 |

Primary Examiner—Charles A. Marmor
Assistant Examiner—Karin Tyson
Attorney, Agent, or Firm—Flynn, Thiel, Boutell & Tanis

[57] ABSTRACT

A wheel alignment repair assembly for modifying wheel alignment in a vehicle suspension of the kind having a wheel support member and a strut with a flange protruding therefrom, the flange having a free edge, and the wheel support member and the flange having holes therethrough alignable for attachment of the wheel support member to the flange of the strut, in which the assembly includes a repair piece having a primary plate and a raised boss on the primary plate defining a step on the repair piece. The step has a shape complementary to the free edge of the flange for maintaining a snug contacting relationship with it. The primary plate may also have thereon a button adapted to snugly fill the hole in the flange when the step on the repair piece is in snug contacting relationship with the free edge of the flange. An arrangment for securing the repair piece to the flange with the step in snug contacting relationship with the free edge is included.

20 Claims, 5 Drawing Sheets

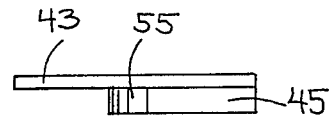
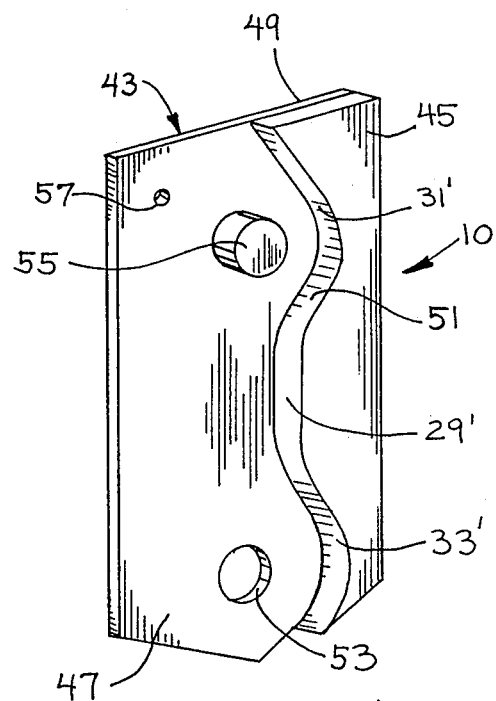
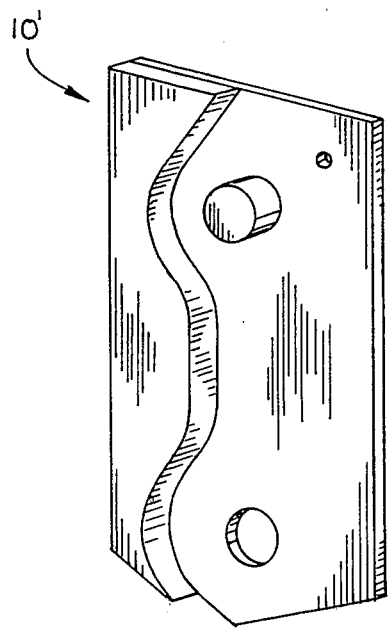

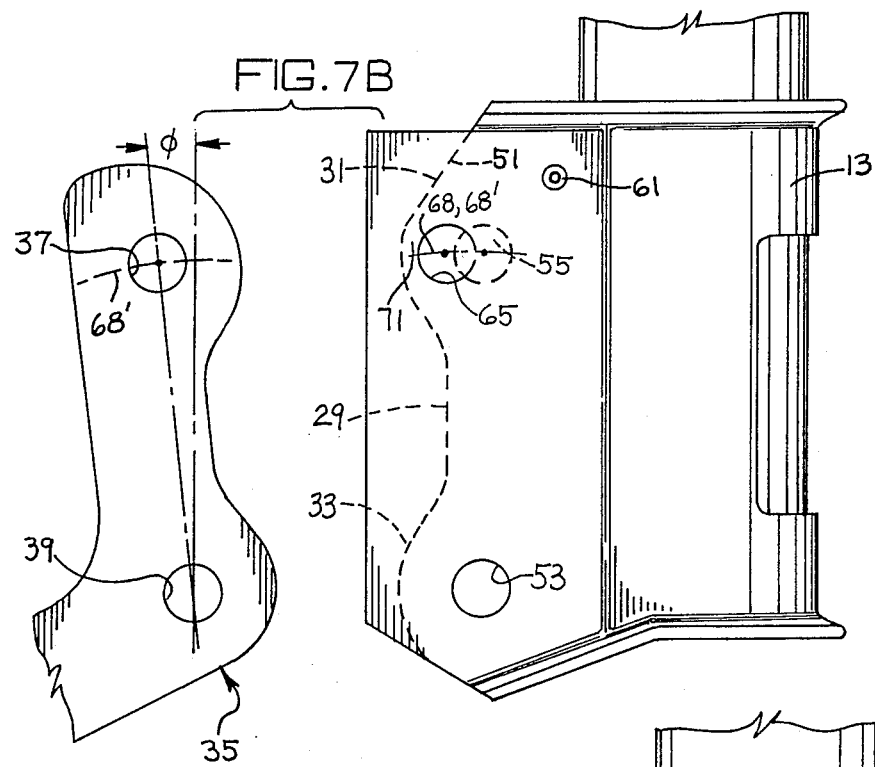

METHOD AND APPARATUS FOR MODIFYING WHEEL ALIGNMENT IN STRUT TYPE SUSPENSION

FIELD OF THE INVENTION

This invention relates to an automotive vehicle suspension and, more particularly, to a method and apparatus for obtaining adjustment of wheel alignment in a non-adjustable vehicle wheel suspension system.

BACKGROUND OF THE INVENTION

In a conventional non-adjustable vehicle wheel suspension system, a vertically extending strut assembly is attached at its upper end to a vehicle body side panel. A pair of laterally extending flanges are mounted on the lower end of the strut assembly. A wheel support member having an end with a flat face is normally bolted in face to face contact between the opposed faces of the flange, thus being held fixedly in place. The wheel support member has fixed to its other end a wheel support assembly with a wheel mounted thereon. In such an arrangement, camber (the relative angle which the central plane of the wheel makes with a vertical axis extending perpendicular to the surface on which the vehicle is supported) is not adjustable. That is, the wheel support member cannot be moved relative to the flange and strut assembly.

The resulting problem is that there is, in this conventional automotive vehicle suspension system, no way to adjust alignment (e.g. camber) to compensate for wear elsewhere in the suspension system. Minor bending of the wheel support member, and inability to get the vehicle unit body precisely back into shape after it is bent in an accident are examples of instances where alignment adjustment is often necessary. In the past, vehicle suspensions incorporating a non-adjustable structure have required high cost repair (e.g. replacement of the entire strut and wheel support member assembly) and in some cases have never been returned to the proper alignment.

U.S. Pat. No. 4,733,884 granted to Pettibone et al on Mar. 29, 1988, includes a repair piece which is superposed on the strut flange and which provides a guide for elongating the upper bolt hole in the flange so that the camber angle between the strut and the wheel support member can be changed. A cam bolt assembly in combination with a cam plate is used to replace the conventional bolt assembly which fastens the wheel support member to the strut flange. The cam bolt assembly is rotated such that its shaft moves laterally within the elongated bolt hole in the flange thereby moving the wheel support member relative to the flange and strut assembly and thus effecting a camber adjustment. The cam bolt assembly is situated such that a cam body thereon is opposed on each lateral side by a cam engaging flange on the cam plate. This prevents the shaft portion of the cam bolt assembly from moving laterally within the elongated hole in the strut flange except when the cam bolt assembly itself is torqued. Thus the cam body on the cam bolt assembly and the cam engaging flanges on the cam plate are necessary for the rigidity of the final adjustment in Pettibone.

Pettibone modifies the bolt hole in the strut flange by laterally elongating it. The edge of the elongated hole is substantially closer to the free edge of the strut flange than was the original hole. This proximity of the modified hole and the free edge of the strut flange weakens same and thereby adversely affects the structural integrity of the entire wheel suspension system.

Accordingly, it is an object of the present invention to provide a repair improvement for the adjustment of a non-adjustable vehicle wheel suspension system that does not weaken the structural integrity of the system.

A further object of the invention is to provide a repair improvement, as aforesaid, which utilizes conventional bolts to effect alignment adjustment as were originally used to connect the strut flange to the wheel support member.

A further object of the invention is to provide a repair improvement, as aforesaid, which prevents the adjusted wheel support member from moving relative to the strut flange by an arrangement substantially the same as the original non-adjustable arrangement.

A further object of the invention is to provide a repair improvement, as aforesaid, which requires forming only a single circular hole in the strut flange equal in size to the original bolt hole.

A further object of the invention is to provide a repair improvement, as aforesaid, which allows a predetermined desired alignment to be realized on the suspension system without "fine tuning" and experimentation at the time of adjustment.

A further object of the invention is to provide a repair improvement, as aforesaid, which is of simple construction, inexpensive, durable and easy to use.

SUMMARY OF THE INVENTION

The objects and purposes of the invention are met by providing a repair assembly for modifying wheel alignment in a vehicle suspension of the kind having a wheel support member releasably fixed to flange means on a strut. A repair piece has a shape at least in part complementary to the flange means for preventing relative slide therebetween. A stabilizing arrangement prevents separation thereof.

A method is provided for modifying wheel alignment in a non-adjustable vehicle suspension of the kind having a strut incorporating flange means and a wheel support member normally fixed to the flange means, and wherein at least one elongate fastening member extends through aligned holes in the flange means and wheel support member, to fix the wheel support member relative to the flange means. The method includes superposing a repair piece on the flange means, and thereafter forming a repair hole, offset from the original hole, in the flange means and superposed repair piece. Thereafter the original hole in the wheel support member is aligned with the repair hole in the flange means and superposed repair piece, and the wheel support member is fixed to the flange means and superposed repair piece by inserting the fastening member through the original hole in the wheel support member and the repair hole in the flange and superposed repair piece. The wheel support member is thereby placed in a different position relative to the flange means than its original position.

BRIEF DESCRIPTION OF THE DRAWINGS

Exemplary embodiments of the invention will be described in detail hereinafter in connection with the drawings, in which:

FIG. 3A is an oblique view of a device embodying the invention;

FIG. 3B is a top view of the inventive device shown in FIG. 3A;

FIG. 4A is an oblique view generally similar to FIG. 3A but showing a device which is complementary to that shown in FIG. 3A;

FIG. 4B is a top view of the device in FIG. 4A;

FIG. 5A is an exploded elevational view depicting the application of the inventive device of FIG. 3A to the conventional strut flange of FIG. 1;

FIG. 5B is an end elevational view of the inventive device shown in FIG. 5A;

FIG. 7B is a view similar to FIG. 5A but showing the inventive device fixedly superposed on a strut flange and subsequent to drilling a repair hole therethrough;

DETAILED DESCRIPTION

Figure 1:
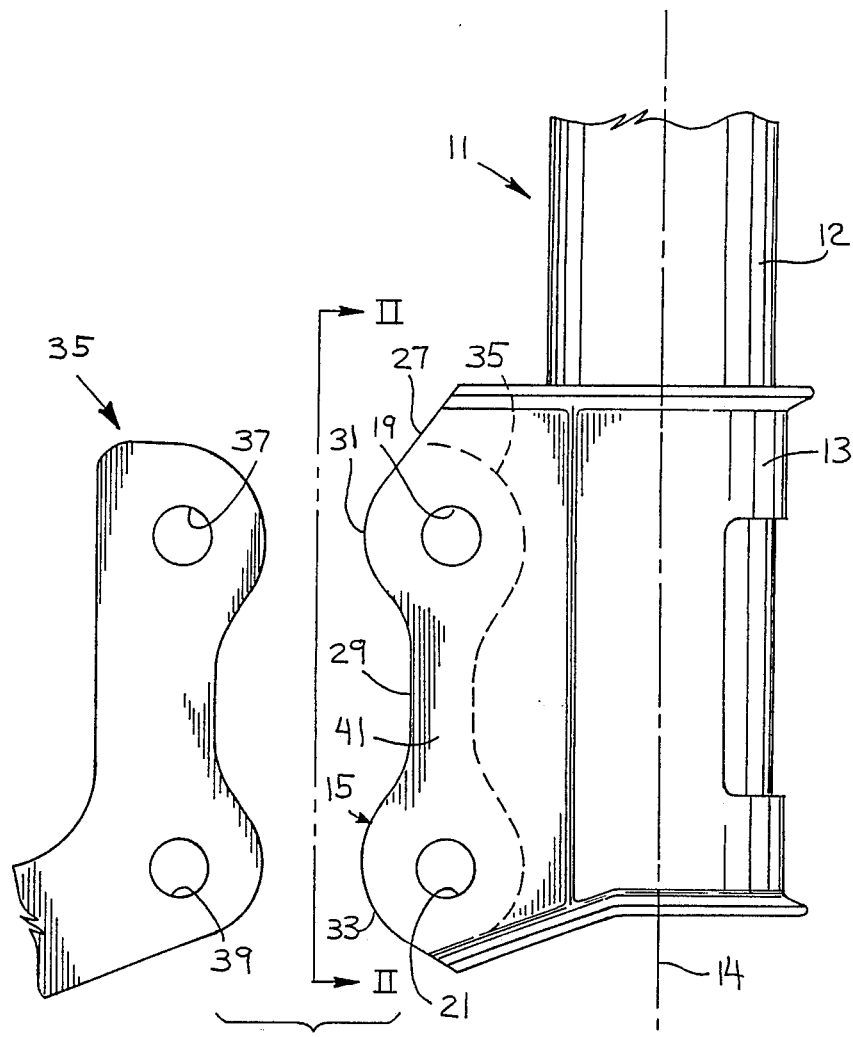
FIG. 1 is an elevational view of a conventional strut flange and wheel support member.
Figure 7A:
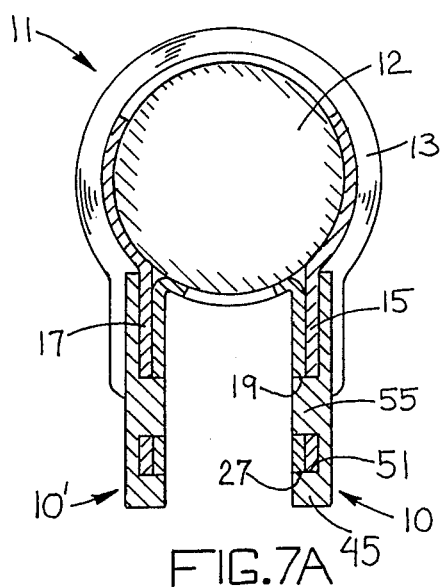
FIG. 7A is a sectional view taken along the line VII—VII of FIG. 6.

In a conventional vehicle wheel suspension system shown in FIG. 1, a strut 11 includes a generally vertically extending elongate post 12 which is attached at its upper end to a vehicle body side panel (not shown). The post 12 is generally circular in cross section as is shown in FIG. 7A. The longitudinal axis 14 of the strut 11 is used hereinafter as a reference axis as shown in FIG. 1.

Figure 2:
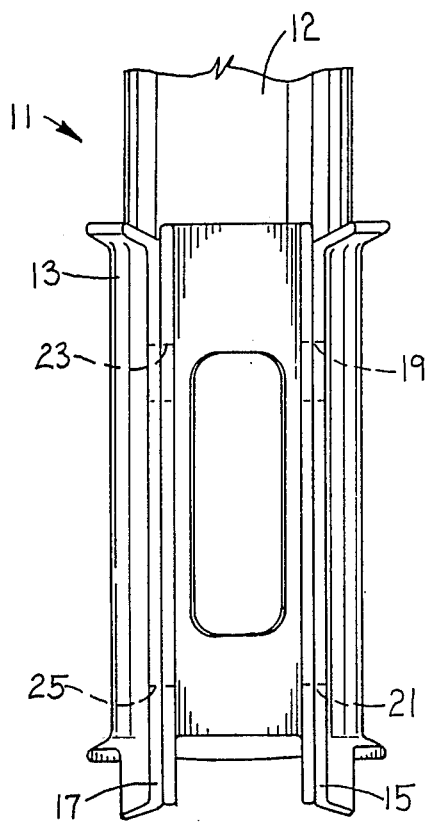
FIG. 2 is an elevational view taken along the line II—II of FIG. 1.

Referring again to FIGS. 1 and 2, a bracket 13 is fixed to the lower end of the post 12 and defines the lower end of the strut 11. The bracket 13 has two flanges 15 and 17 which protrude laterally away from the axis 14 of the strut 11. As shown in FIG. 7A, the bracket 13 surrounds the post 12, and the flanges 15 and 17 extend away from the post parallel to each other. As shown in FIGS. 1 and 2, the flanges 15 and 17 are pierced by respective pairs of equal diameter, axially aligned and spaced circular holes 19 and 21, and 23 and 25.

The flanges 15 and 17 are mirror images of each other and a description of flange 15 will also serve for flange 17. The flange 15 is axially elongate and has a sinuously curved free edge 27 spaced laterally from the post 12 and extending generally parallel to the strut axis 14. The free edge 27 extends between the axial ends of the strut flange 15. The free edge 27 includes an axially central portion 29 and two curved portions 31 and 33. The curved portions 31 and 33 extend from the axially extending central portion 29 to the axial extremities of the flange 15. The curved portions 31 and 33 have a radius of curvature generally concentric with the circular holes 19 and 21 of the flange 15. The free edge 27 thus extends from the upper axial extremity of the flange 15, curving away from the strut axis 14, the curved portion 31 extending along a radius of curvature approximately three times the radius of the hole 19. The curved portion 31 extends generally axially from the upper axial extremity of the flange 15 to a point laterally adjacent a tangent to holes 19 and 21 drawn parallel to the strut axis 14 on the side of the holes laterally remote from the strut. At that point the curved portion 31 meets the central portion 29 which extends parallel to the strut axis 14 and toward the curved portion 33. At a point where the distance from the central portion 29 to the center of the hole 21 is slightly more than three times the radius of the hole 21, the central portion 29 joins the curved portion 33. The curved portion 33 then extends generally toward the lower axial extremity of the flange 15 along the radius of curvature described above with respect to the curved portion 31.

The conventional vehicle wheel suspension system of FIGS. 1 and 2 further includes a wheel support member 35. The wheel support member 35 has vertically aligned and spaced circular holes 37 and 39 of diameter and vertical spacing equal to the hole pairs 19 and 21, and 23 and 25 of flanges 15 and 17, respectively. In use, the wheel support member 35 is positioned between the flanges 15 and 17 so that the hole 37 is coaxially aligned with the hole 19 in the flange 15 and the hole 23 in the flange 17 and the hole 39 is coaxially aligned with the hole 21 in the flange 15 and the hole 25 in the flange 17 as shown in the dotted line in FIG. 1. The wheel support member 35 is fixed in place between the flanges 15 and 17 by a pair of bolts (not shown) which pass through the aligned holes 19, 23 and 37, and 21, 25 and 39. The bolts (not shown) snugly fit the holes so that there is ordinarily no adjustability in relative positioning of the strut 11 and wheel support member 35. The stock orientation of the wheel (e.g. camber) is thus fixed.

The foregoing describes a conventional vehicle suspension system which is an example of a vehicle suspension in connection with which the present invention is useable.

Attention is now directed to structure embodying the present invention.

A repair piece 10 shown in FIG. 3A is designed to adjust the alignment of a conventional vehicle wheel suspension system, such as that above discussed with respect to FIGS. 1 and 2. Referring to FIG. 3A, the repair piece 10 includes a primary plate 43 with a raised boss 45 thereon. The primary plate 43 is elongate, being approximately equal to the conventional strut flange 15 in length, and considerably wider than the flange. The raised boss 45 protrudes from one face 47 of the primary plate 43 to a dimension that is determined by the thickness of the flange 15. The boss 45 overlaps one side portion 49 of the primary plate 43. The raised boss 45 has a sinuously curved edge portion forming a step 51 overlying the central portion of the primary plate 43. The contour of the sinuously curved step 51 is complementary to the sinuously curved free edge 27 of the flange 15. The step 51 thus has curved portions 31' and 33' separated by a central portion 29'. The curved portions 31' and 33' are concavely curved to complement the convexly curved portions 31 and 33 of the free edge 27.

The inventive repair piece 10 shown in FIG. 3A is adapted to overlie the portion of the flange 15 having holes 19 and 21 and sinuously curved free edge 27, with the sinuously curved free edge 27 abutting the sinuously curved complementary step 51 of the raised boss 45 in a snug contacting manner. In that position, a circular hole 53 in the primary plate 43 coaxially aligns with the same diameter hole 21 in the flange 15 for fixing the repair piece 10 to the flange 15 by a bolt 63 shown in FIG. 6. A cylindrical button 55 protrudes from the upper central portion of the face 47 of the primary plate 43 to a dimension which is the same as raised boss 45. The button 55 is located on the face 47 to be snugly received in the upper hole 19 in the flange 15 when the sinuously curved free edge 27 abuts the sinuously curved complementary step 51 in a snug contacting relationship. The repair piece 10 is thus precisely locatable on the flange 15 by its sinuous step 51, button 55 and circular hole 53.

Optionally, the upper corner of the primary plate 43 opposite the boss 45 may be provided with a small circular hole 57 as shown in FIG. 3A. A corresponding hole 59 may be drilled in the flange 15, as shown in FIG. 5A, to receive a pop rivet or other temporary holding means to assure that the repair piece 10 cannot become accidentally dislodged from its precise position on the flange 15 by a subsequent drilling operation described below. Although the boss 45 and button 55 are, in this embodiment, secondary plates attached to the primary plate 43, it is contemplated by the invention that a single integral repair piece could be manufactured so as to include the above described features of the repair piece 10.

It should be noted that the above description of the repair piece 10 in FIG. 3A and its application to the strut flange 15 applies to the complementary repair piece 10' shown in FIG. 4A and its application to the strut flange 17. Similarly, the method for modifying wheel alignment discussed below with reference to the repair piece 10 of FIG. 3A and flange 15 of FIG. 1 is equally applicable to the repair piece 10' of FIG. 4A and the flange 17 of FIG. 2.

OPERATION

The inventive repair piece 10 may be used to adjust alignment in a non-adjustable vehicle wheel suspension system. As shown in FIG. 5A, the repair piece 10 is oriented so that the step 51 parallels the free edge 27 of the flange 15. The repair piece 10 is then superposed on the flange 15 so that it overlies the flange 15 with its face 47 opposing a face 41 of the flange 15, the face 41 being opposite the face to which the wheel support member 35 is bolted. The overlying position of the repair piece 10 with respect to the flange 15 is such that the sinuous step 51 abuts the free edge 27 of the flange 15 in a snug contacting relationship, and the button 55 fills the hole 19 of the flange 15 (see FIG. 7A). The complementary curved portions 31' and 33' of the step 51 abut the curved portions 31 and 33 of the free edge 27, and the central portions 29' and 29 similarly abut. In this position, the optional rivet holes 57 and 59 are coaxially aligned as are the hole 21 in flange 15 and the hole 53 in the primary plate 43. A bolt 63 is inserted through the coaxially aligned holes 21 and 53 at this time. This should be sufficient to prevent relative movement of the flange 15 and repair piece 10 during a drilling operation disclosed below. However, as shown in FIG. 6, a rivet 61 may also be inserted through the optional rivet holes 57 and 59, if necessary, to further prevent the repair piece 10 from moving relative to the flange 15.

Thereafter, a repair hole 65 is drilled through both of the superposed primary plate 43 and flange 15, as shown in chain lines in FIG. 5A. The repair hole 65 is offset either rightwardly or leftwardly from the original hole 19 in the flange 15. To this end, and as shown in FIG. 5A, several alternate punch marks 67, 67' and 67" are provided on the back face 66 of the primary plate 43 of the repair piece 10. The punch marks 67, 67' and 67" are distributed along an arc 68 which is concentric with the center of hole 53 and passes through the center of the button 55. The punch marks 67, 67' and 67" are varyingly offset from the button 55. Therefore, a repair hole 65 drilled coaxially through one of these punch marks 67, 67' and 67", and being of the same diameter as the original hole 19 of the flange 15, will be slightly offset from the center of the button 55 along the arc 68. The reason for this distribution of punch marks will become apparent below. Repair hole 65 goes through the repair piece 10 and would carry away a part of the button 55 or even perhaps a small portion of the raised boss 45. In the example shown, the repair hole 65 is drilled through punch mark 67 in repair piece 10. Continuing the drilling of the repair hole 65 through the flange 15 results in a repair hole which is laterally offset from the original flange hole 19. Since the button 55 fills the original hole 19 in the flange 15, the new result is a lateral shift or "adjustment" of the effective location of the hole 19 in the flange 15.

It will be understood that the foregoing steps are also carried out on the repair piece 10' superposed on the other strut flange 17, to similarly laterally shift the effective location of the hole 23 at the flange 17.

Figure 6:
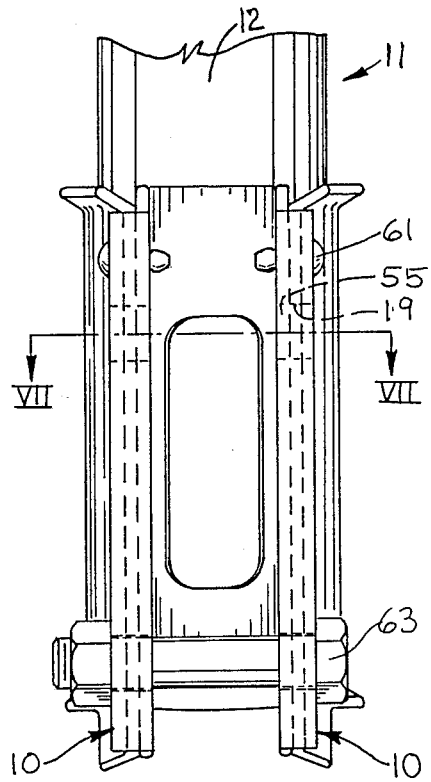
FIG. 6 is an elevational view generally similar to FIG. 2 but showing the inventive devices of FIGS. 3A and 4A at the point in the inventive method where they are attached to the conventional strut flanges of FIG. 2.
Figure 9:
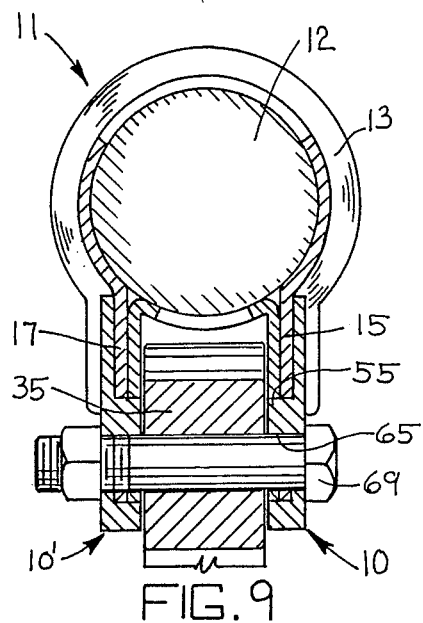
FIG. 9 is a sectional view taken along the line IX—IX of FIG. 8.
Figure 8:
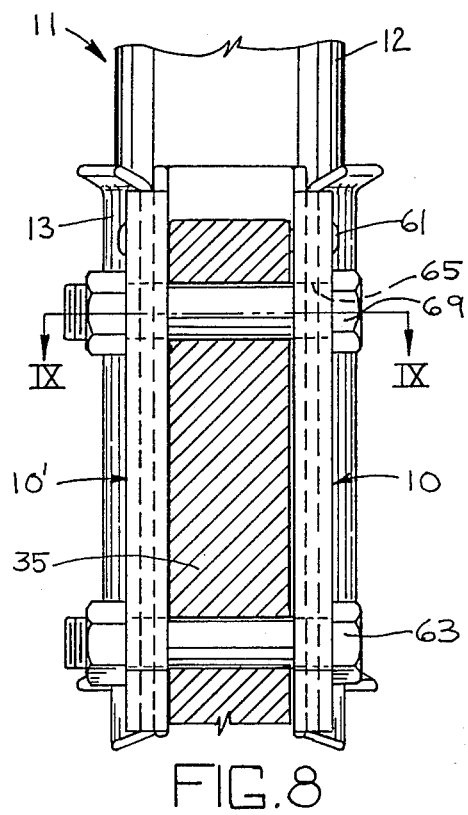
FIG. 8 is an elevational view generally similar to FIG. 6 but showing the strut flange assembly after the steps of the inventive method have been completed.

With the repair holes 65 in the superposed members 10, 15 and 10', 17 completed, the bolt 63 shown in FIG. 6 can be temporarily removed for the purpose of inserting the wheel support member 35 between the flanges 15 and 17 so as to align coaxially the hole 37 in the wheel support member with the repair holes 65 and the hole 39 in the wheel support member with the holes 21 and 25 in the flanges 15 and 17 and the hole 53 in the primary plate 43 of each of the repair pieces 10 and 10'. This done, the bolt 63 may be inserted through the aligned holes 21 and 53 (flange 15 and repair piece 10), 39 (wheel support member 35), and 25 and 53 (flange 17 and repair piece 10'). A second bolt 69 shown in FIGS. 8 and 9 may be inserted through the hole 37 in wheel support member 35 and the repair holes 65 in flanges 15 and 17. Because of the thickness added by the repair pieces 10 and 10', the bolts 63 and 69 may be longer than the original bolts used in the vehicle suspension system, but are otherwise substantially the same as the original bolts. This process of effectively changing the location of the coaxial holes 19 and 23 in the strut flanges 15 and 17 allows the wheel support member 35 to be oriented in a different position relative to the flanges 15 and 17 and thus to the strut 11, thereby achieving the desired camber adjustment represented by an angle $\phi$ in FIG. 7B.

It is apparent from the above discussion and FIG. 7B that camber adjustment is accomplished, in this example, by pivotally relocating the wheel support member 35 about the center of its hole 39 with the latter coaxial with the hole 21 through the flange 15. Thus, the center of the wheel support hole 37 is pivotally relocated along an arc 68' which is concentric with the coaxial holes 21 and 39. The arc 68 on which the punch marks 67, 67' and 67" are located on the repair piece 10 (FIG. 5A) is concentric with the repair piece hole 53 and passes through the center of the button 55. The arcs 68 and 68' are of equal radius. When the hole 39 of the wheel support member 35 is coaxially aligned with the holes 21 and 53 of the flange 15 and repair piece 10, respectively, as discussed above, the arcs 68 and 68' are exactly superposed. Therefore, the wheel support hole 37, which is pivotally relocated along the arc 68' to effect camber adjustment, will be coaxially alignable with any repair hole 65 that is centered on the arc 68.

As shown in FIGS. 7A and 7B, when the repair piece 10 is superposed on the flange 15 so that the button 55 fills the hole 19, and the step 51 abuts the free edge 27 of the flange in a snug contacting relationship, the boss 45 effectively extends the lateral dimension of the flange 15 as it extends away from the strut 11. Thus when the repair hole 65 shown in FIG. 5A is located laterally further from the strut 11 than was the original hole 19, the potential structural weakness of the flange 15 due to the narrow portion 71 (FIG. 5A) of the flange between the repair hole 65 and the free edge 27 is avoided by the lateral structural reinforcement provided by the boss 45. Also, because the repair hole 65 has the same diameter as the original hole 19 in the flange 15, the original diameter conventional bolt 69 may be used to reattach the wheel support member 35 to the flanges 15 and 17 after the adjustment. However, because of the thickness added by the repair pieces 10 and 10', a longer bolt 69 may be needed.

Note that the location of the repair hole 65 can be determined and then marked on the repair piece 10 if not already pre-punched thereon. Then, when the repair piece 10 is superposed on the flange 15 and the repair hole 65 is drilled through both, no further fine tuning is needed. The camber is adjusted as desired. By inserting the bolts 63 and 69 through the holes as described above, the adjustment is fixed, as shown in FIGS. 8 and 9.

The foregoing described embodiment is inteded only as an example and not as a limitation. It is contemplated that minor structural variations will adapt the disclosed embodiment to various vehicle suspension systems of the general type disclosed herein. Contemplated modifications include changes in bolt hole sizes and locations, repair piece size and perimeter shape, boss configuration, button configuration, and the like.

Although a particular preferred embodiment of the invention has been disclosed in detail for illustrative purposes, it will be recognized that variations or modifications of the disclosed apparatus, including the rearrangement of parts and adaptation for use with various vehicle suspension systems, lie within the scope of the present invention.

The embodiments of the invention in which are exclusive property or privelege is claimed are defined as follows:

1. A wheel alignment repair assembly for effecting a modified but non-adjustable wheel alignment in a vehicle suspension of the kind having a wheel support member, a strut mounted on the vehicle, said strut having a flange protruding laterally therefrom, said flange having a free edge, said flange and wheel support member having holes therethrough alignable for attachment of said wheel support member to said flange of said strut, said repair assembly comprising:

a repair piece having a primary plate, a raised boss on said primary plate, said boss defining a step on said repair piece, said step having a shape complementary to said free edge of said flange for maintaining a snug contacting relationship with said free edge of said flange, said repair piece being substantially wider laterally than said strut flange by an amount approximately equal to the lateral width of said raised boss, said width of said raised boss being substantially greater than the height of said step defined thereby; and means for securing said repair piece to said flange with said step in said snug contacting relationship with said free edge, said repair piece, when secured on said flange, protruding laterally substantially beyond said flange free edge by an amount approximately equal to said width of said boss, said boss extending laterally from said flange free edge and terminating at a lateral free edge which is spaced substantially and laterally from said flange free edge, said boss providing lateral structural reinforcement of said flange at said flange free edge.

2. The apparatus according to claim 1, wherein said securing means includes at least one fastening hole is said fastening primary plate and fastening means operable in said hole for fastening said repair piece to said flange.

3. The apparatus according to claim 2, wherein said fastening means includes a bolt through said at least one fastening hole in said primary plate and through one of said holes in said flange.

4. The apparatus according to claim 2, wherein said fastening means is a rivet.

5. The apparatus according to claim 1, wherein said repair piece includes a button fixed on said primary plate laterally of said raised boss to snugly and completely fill one of said holes in said flange when said step of said repair piece is in said snug contacting relationship with said free edge of said flange, said button protruding from said primary plate to a height substantially equal to the height of said step defined by said boss.

6. The apparatus according to claim 5, wherein said raised boss and step comprise a secondary plate attached to a first face of said primary plate.

7. The apparatus according to claim 6, wherein said repair piece includes punch marks for drilling, said punch marks being located on a second face of said primary plate opposite said first face and being respectively laterally offset from said button.

8. A wheel alignment repair assembly for effecting a modified but non-adjustable wheel alignment in a vehicle suspension of the kind having a wheel support member, a strut mounted on the vehicle, said strut having a flange protruding laterally therefrom, said flange having a free edge, said flange and wheel support member having holes therethrough alignable for attachment of said wheel support member to said flange of said strut, said repair assembly comprising:

a repair piece having a primary plate, said primary plate having a first face adapted to bear flush against said flange, means for facilitating forming a further hole in said flange which is laterally offset from one of said first-mentioned holes in said flange, including a solid button fixed on said first face of said primary plate and protruding therefrom to snugly and completely fill said one first-mentioned hole in said flange so as to completely occupy the space in said flange defined by said one first-mentioned hole when said first face is flush against said flange; and means for securing said repair piece to said flange with said button snugly filling said one first-mentioned hole in said flange and said first face flush against said flange.

9. The apparatus according to claim 8, wherein said securing means includes at least one fastening hole in said primary plate and fastening means operable in said fastening hole for fastening said repair piece to said flange.

10. The apparatus according to claim 9, wherein said fastening means includes a bolt through said at least one fastening hole in said primary plate and through one of said first-mentioned holes in said flange, and wherein said button defines a right circular cylinder.

11. The apparatus according to claim 9, wherein said fastening means is a rivet.

12. The apparatus according to claim 8, wherein said button comprises a secondary plate attached to a said first face of said primary plate.

13. The apparatus according to claim 12, wherein said repair piece includes punch marks for drilling, said marks being located on a second face of said primary plate opposite said first face and being respectively laterally offset from said button.

14. A method of modifying wheel alignment in a non-adjustable suspension strut assembly in an automotive vehicle, the strut assembly being of the kind having a strut incorporating a protruding flange, said flange having a free edge, and a wheel support member normally fixed to the flange in one relative position by at least one elongate fastening member extending through aligned original holes in the flange and wheel support member, comprising the steps:
providing a repair piece;
superposing said repair piece on said flange;
fixing said superposed repair piece to said flange;
there after simultaneously forming a repair hole through both said flange and said superposed repair piece, said repair hole being offset from said original hole in said flange;
aligning coaxially said original hole in said wheel support member with said repair hole in said flange and superposed repair piece; and
fixing said wheel support member to said flange and superposed repair piece in a different relative position by inserting said fastening member through said original hole in said wheel support member and said repair hole in said flange and superposed repair piece.

15. The method according to claim 14, wherein said superposing step includes the step of abutting a step defined by a raised boss formed on said repair piece against said free edge of said flange.

16. A method of modifying wheel alignment in a non-adjustable suspension strut assembly in an automotive vehicle, the strut assembly being of a kind having a strut incorporating a protruding flange, said flange having a free edge, and a wheel support member normally fixed to the flange in one relative position by at least one elongate fastening member extending through aligned original holes in the flange and wheel support member, comprising the steps:
providing a repair piece;
superposing said repair piece on said flange, including inserting a button formed on said repair piece in said original hole in said flange;
fixing said superposed repair piece to said flange;
forming a repair hole through said flange and superposed repair piece, said repair hole being offset from said original hole in said flange;
aligning coaxially said original hole in said wheel support member with said repair hole in said flange and superposed repair piece; and
fixing said wheel support member to said flange and superposed repair piece in a different relative position by inserting said fastening member through said original hole in said wheel support member and said repair hole in said flange and superposed repair piece.

17. The method according to claim 16, wherein said forming step includes the step of removing a portion of said button.

18. The method according to claim 17, wherein said fixing step includes the step of inserting a bolt through a fastening hole in said repair piece and through a further hole in said flange.

19. The method according to claim 17, wherein said fixing step includes the step of riveting said superposed repair piece to said flange.

20. The method according to claim 16, wherein said superposing step further includes the step of abutting a step defined by a raised boss formed on said repair piece against said free edge of said flange.

* * * * *

UNITED STATES PATENT AND TRADEMARK OFFICE
CERTIFICATE OF CORRECTION

PATENT NO. : 4 948 160

DATED : August 14, 1990

INVENTOR(S) : David L. Barry

It is certified that error appears in the above-identified patent and that said Letters Patent is hereby corrected as shown below:

Col. 8, lines 11-12; change "hole is said" to ---hole in said---.

Col. 8, line 13; change "in said hole for fastening" to ---in said fastening hole for fastening---.

Signed and Sealed this

Seventh Day of January, 1992

Attest:

HARRY F. MANBECK, JR.

*Attesting Officer*      *Commissioner of Patents and Trademarks*